Jan. 30, 1940. W. J. CHIEVITZ 2,188,854
OIL SEAL
Filed Oct. 15, 1937
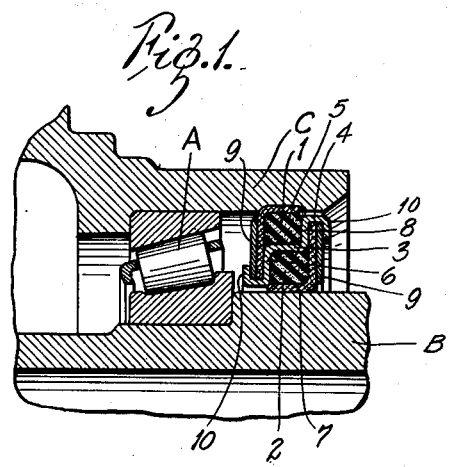
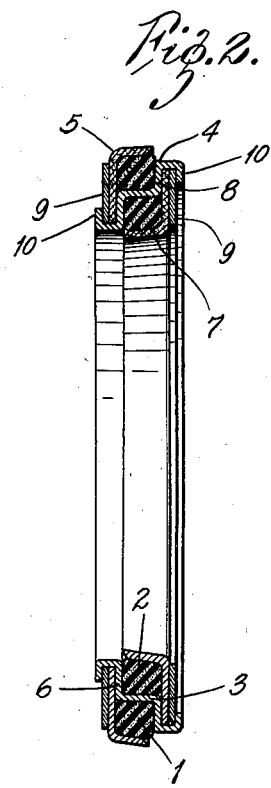
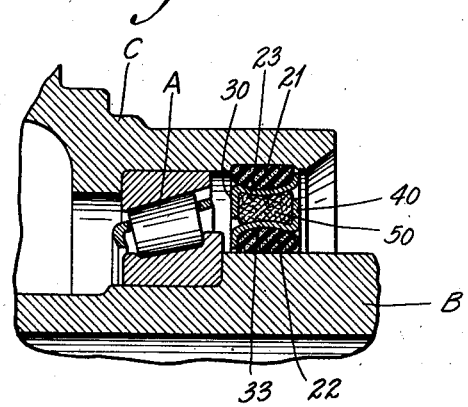
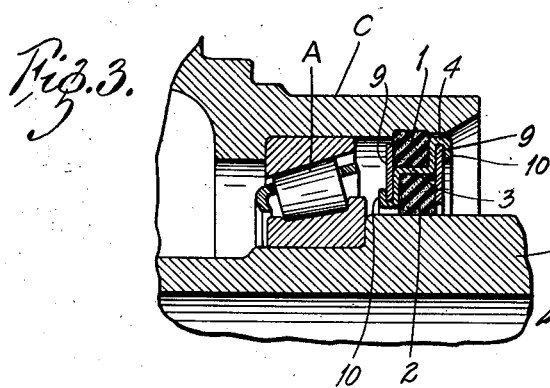
INVENTOR:
William J. Chievitz
HIS ATTORNEYS.

Patented Jan. 30, 1940

2,188,854

UNITED STATES PATENT OFFICE 2,188,854

OIL SEAL

William J. Chievitz, Canton, Ohio, assignor to The Timken Roller Bearing Company, Canton, Ohio, a corporation of Ohio Application October 15, 1937, Serial No. 169,096

5 Claims. (Cl. 288—3)

This invention relates to devices for preventing the escape of oil or grease from bearings. The principal object of the present invention is to devise a seal of simple construction which will be easy to mount and replace, which will be efficient in operation, which will not require as accurate machining of associated parts as has heretofore been usual, which will be resistant to heat, acid, water, grit and dirt, and which will be flexible throughout a wide range of temperature. The invention consists in the device and in the combinations and arrangements of parts hereinafter described and claimed.

In the accompanying drawing, wherein like reference numerals refer to like parts wherever they occur, Fig. 1 is a longitudinal sectional view of a sealing ring embodying my invention shown in connection with a bearing interposed between relatively rotatable inner and outer members;

Fig. 2 is a central longitudinal section through the sealing ring shown in Fig. 1; and Figs. 3 and 4 are views similar to Fig. 1 showing two modifications of my sealing device.

In the constructions illustrated in the drawing, A represents a taper roller bearing interposed between relatively rotatable inner and outer members B and C, respectively.

In the construction illustrated in Fig. 1, there are two thick elastic rings 1, 2 arranged concentrically in contact with and on opposite sides of the barrel or cylindrical portion 3 of a Z-shaped metal ring 4. An angular ring 5 of rawhide or the like is disposed with its cylindrical portion in contact with the outer peripheral surface of the outer elastic ring 1 and with its radial portion extending inwardly partly in contact with the free end of said elastic ring and partly in contact with the inwardly extending flange 6 of the metal ring 4. A second angular rawhide ring 7 is arranged with its cylindrical portion in contact with the inner peripheral surface of the inner elastic ring 2 and with its radially disposed end flange in contact flatwise partly with the free end of the inner elastic ring 2 and partly with the outwardly extending flange 8 of the Z-shaped metal ring 4. Flat metal rings or washers 9 are arranged in contact with the outer faces of the radial portions or end flanges of the respective rawhide rings. The several parts are held in assembled relation by curling or bending the ends of the flanges 10 of the Z-shaped metal ring 4 over and around the adjacent margins of the flat metal rings 9 and of the interposed radial portions or flanges of the rawhide rings. In this position of the parts, the peripheral portion of the outside rawhide ring 5 is of greater diameter than the outside diameter of the outwardly extending flange of the Z-shaped metal ring 4 and of the flat metal ring 9; and the diameter of the cylindrical portion of the inner rawhide ring 7 is less than the inside diameters of the two metal rings 9.

The material which I contemplate using for making the elastic rings of Fig. 1 is a treated rubber or a synthetic rubber such as those known under the commercial names of Thiokol and Neoprene. These materials are elastic, resistant to the heat to which oil seals are ordinarily exposed in service and they are resistant to acid, water, grit and dirt, and they maintain their flexibility and elasticity throughout the range of temperature occurring in service.

The operation of the construction above described is as follows: The device is contracted circumferentially sufficiently to enter the annular space between the relatively rotatable inner and outer members B and C and is forced endwise until it reaches a circumferential groove provided therefor in the surface of one of said members, whereupon it automatically snaps into said groove where it is held fast. If the device is to be held fast in the outer member and have sliding contact with the inner member, the outside diameter of the outer elastic ring, in unstressed condition, should be enough greater than the diameter of the groove to insure a pressure of the elastic ring against the bottom of the groove adequate for the purpose; and in such case, the inside diameter of the inner elastic ring in unstressed condition should be only so much less than the outside diameter of the inner member as to insure a sliding fit of the device around said inner member. Thus, while it is the rawhide rings of my device which actually make contact with the inner and outer members, the elastic rings constitute tensioning elements or cushions for the rawhide rings. Thus the elastic rings enable the device to function efficiently even when when there is appreciable eccentricity between the surfaces of the inner and outer members and they also enable the device to function efficiently when the surfaces of the inner and outer members are poorly machined.

While I prefer to use rawhide rings, as above described, it is obvious that they may be dispensed with, as shown in Fig. 3, in which case the circumferential surfaces of the elastic rings may contact directly with the inner and outer members.

The construction illustrated in Fig. 4 comprises two thick rings 21, 22 of elastic material arranged concentrically, one within the other. The inner peripheral portion of the outer elastic ring 21 is seated on the barrel portion 23 of a ring of metal pressed into Z-shape, the outer surface of said barrel being concaved in the axial direction and the inner surface of said barrel being convexed in the axial direction. The inner peripheral portion of the inner elastic ring 22 is seated on the barrel portion of a Z-shaped ring 33, the outer surface of the barrel portion being convexed in the axial direction and the inner portion thereof being concaved in the axial direction. In the hourglass-shaped space, which is bounded by the two barrel portions 23, 33 and by the inwardly extending flange 30 of the outer metal ring and the outwardly extending flange 40 of the inner metal ring, is located a ring 50 of suitable packing material, such, for instance, as is commonly used for packing stuffing boxes. This material fills the hourglass-shaped space and serves to lock the two metal rings 23, 33 together, and the concavities in the barrels of said rings serve to lock the elastic rings in place.

The construction illustrated in Fig. 4 is especially advantageous where the surfaces of both inner and outer members are so rough or uneven that it is difficult to maintain an oil-tight sliding contact therewith. In such cases, both the inner and outer elastic rings of the construction of Fig. 4 are held fast by frictional engagement under stress of the elastic material; and in a similar way, they are both held fast to their respective metal rings. In this case, the sealing is effected by the packing material between the two metal rings, one of which rotates and the other is stationary.

Obviously my device is applicable to bearings generally.

What I claim is:

1. A sealing ring comprising a metal ring of Z-shape section, rings of elastic material in the angles between the barrel of the metal ring and the flanges at its respective ends, rawhide or like sealing rings of angular section next to the periphery and free ends of the respective rings of elastic material with their flat sides extending past the barrel of the Z-shaped ring, locking rings next to said rawhide rings and means for clamping said locking rings together.

2. A sealing ring comprising a metal ring of Z-shape section, rings of elastic material in the angles between the barrel of the metal ring and the flanges at its respective ends, rawhide or like sealing rings of angular section next to the periphery and free ends of the respective rings of elastic material with their flat sides extending past the barrel of the Z-shaped ring, and locking rings next to said rawhide rings, the flanges of the Z-shape ring being bent around said locking rings and rawhide rings to fasten the assembly together.

3. A sealing device comprising a metal ring having a barrel portion and an outwardly extending flange at one end thereof and an inwardly extending flange at the other end, said inwardly extending flange having an outwardly opening channel, a thick ring of elastic material fitting in the angle between said barrel and said flange and extending beyond said flange, a sealing ring of rawhide or the like extending around the periphery and free face of said thick ring, the inner margin of said sealing ring being in said channel, and means for holding said parts in assembled relation, said means comprising a metal washer in contact with the outer radial face of said thick ring and whose inner margin is clamped in said channel by the outer wall thereof.

4. A sealing device comprising a metal ring having a barrel portion with annular flanges at the ends thereof, one of said flanges extending outwardly and the other extending inwardly, and one of said flanges having an annular groove opening towards said barrel, a thick ring of elastic material fitting said barrel portion, a sealing ring of rawhide or the like of angular section with an edge portion in said groove and with its axially extending portion lapping said thick ring, and a metal washer with an edge portion secured in said groove to hold said parts in assembled relation.

5. A sealing device comprising a metal ring having a barrel portion with annular flanges at the ends thereof extending inwardly and outwardly, respectively, the outwardly extending flange having an inwardly opening annular groove, a thick ring of elastic material mounted in said barrel portion, a sealing ring of rawhide or the like of angular section with its outer edge portion in said groove and with its axially extending portion lapping said thick ring, and a metal washer with an edge portion secured in said groove to hold said parts in assembled relation.

WILLIAM J. CHIEVITZ.